US011024222B2

(12) United States Patent
Cho et al.

(10) Patent No.: US 11,024,222 B2
(45) Date of Patent: Jun. 1, 2021

(54) DISPLAY DEVICE AND CONTROL METHOD THEREOF

(71) Applicant: SAMSUNG ELECTRONICS CO., LTD., Suwon-si (KR)

(72) Inventors: Younghoon Cho, Suwon-si (KR); Jiyong Park, Suwon-si (KR); Sangkyun Im, Suwon-si (KR); Minji Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/810,259

(22) Filed: Mar. 5, 2020

(65) Prior Publication Data

US 2020/0286422 A1 Sep. 10, 2020

(30) Foreign Application Priority Data

Mar. 5, 2019 (KR) ........................ 10-2019-0025097

(51) Int. Cl.
*G06F 1/00* (2006.01)
*G09G 3/32* (2016.01)

(52) U.S. Cl.
CPC ......... *G09G 3/32* (2013.01); *G09G 2320/043* (2013.01)

(58) Field of Classification Search
None
See application file for complete search history.

(56) References Cited

U.S. PATENT DOCUMENTS

| | | | | |
|---|---|---|---|---|
| 9,345,094 | B2 * | 5/2016 | Lee | H05B 45/10 |
| 2006/0050032 | A1 | 3/2006 | Gunner et al. | |
| 2017/0031082 | A1 * | 2/2017 | Song | G02B 6/0016 |
| 2018/0158401 | A1 * | 6/2018 | Wang | G09G 3/3225 |
| 2019/0197959 | A1 * | 6/2019 | Noh | G09G 3/3258 |

FOREIGN PATENT DOCUMENTS

| | | | |
|---|---|---|---|
| JP | 5347100 | B2 | 11/2013 |
| KR | 10-1319318 | B1 | 10/2013 |
| KR | 10-1547514 | B1 | 9/2015 |

OTHER PUBLICATIONS

Communication dated Jul. 10, 2020 issued by the European Patent Office in European Application No. 20160671.2.

* cited by examiner

*Primary Examiner* — Michael A Faragalla
(74) *Attorney, Agent, or Firm* — Sughrue Mion, PLLC

(57) ABSTRACT

A display device is provided. The display device includes a light emitting diode (LED) module including a plurality of LEDs; a plurality of driving integrated chips (ICs), each of the plurality of driving ICs being configured to apply voltages to a corresponding group of the plurality of LEDs; and a controller. The controller is configured to identify a first voltage corresponding to a first LED from among the plurality of LEDs based on image data, identify a first LED driving voltage as the first voltage or a second voltage based on the first voltage and a reference value, and control a first driving IC, from among the plurality of driving ICs, that corresponds to the first LED based on the first LED driving voltage.

16 Claims, 13 Drawing Sheets

104

131 : 131-1, 131-2, ......, 131-40

DISPLAY DEVICE AND CONTROL METHOD THEREOF

CROSS-REFERENCE TO RELATED APPLICATION(S)

This application is based on and claims priority under 35 U.S.C. § 119 to Korean Patent Application No. 10-2019-0025097, filed on Mar. 5, 2019, in the Korean Intellectual Property Office, the disclosure of which is incorporated by reference herein in its entirety.

BACKGROUND

1. Field

The disclosure relates to a display device and control method thereof, which controls forward and backward voltages applied across a light emitting diode device.

2. Description of Related Art

Display devices are used as output devices for visually presenting image data, and are used in various areas such as homes and businesses.

Display devices may be implemented in various manners. For example, some displays control transmission of light emitted by a backlight unit through a panel, and other displays directly emit light. The displays that directly emit light may include an organic light emitting diode display that uses organic materials based on an electroluminiscence effect by which a fluorescent organic compound emits light when a current is applied to the fluorescent organic compound, and an inorganic light emitting diode display using inorganic compounds.

The inorganic light emitting diode display has light emitting diodes (LEDs) directly display image data based on a voltage applied across terminals of each LED. When a difference in voltage between both terminals of the LED is greater than a reference voltage, the LED emits light.

An LED display may steadily perform a discharging operation to control a voltage at an anode of the LED terminals by discharging a capacitor connected in parallel with the LED terminals and a pre-charging operation to control a voltage at a cathode of the LED terminals by charging the capacitor at all light emitting levels.

In this case, when input image data is a low grayscale image value, such as a black image, a voltage may be applied across the LED terminals according to the steady discharging and charging operations. When such a voltage is continuously applied, the LED may be stressed and thus the lifespan of the LED may be shortened.

SUMMARY

Provided are a display device and control method thereof, which controls the magnitude of a voltage applied to an LED based on an input signal, thereby reducing the stress on the LED and increasing the lifespan of the LED.

In accordance with an aspect of the disclosure, a display device includes a light emitting diode (LED) module including a plurality of LEDs; a plurality of driving integrated chips (ICs), each of the plurality of driving ICs being configured to apply voltages to a corresponding group of the plurality of LEDs; and a controller. The controller is configured to identify a first voltage corresponding to a first LED from among the plurality of LEDs based on image data, identify a first LED driving voltage as the first voltage or a second voltage based on the first voltage and a reference value, and control a first driving IC, from among the plurality of driving ICs, that corresponds to the first LED based on the first LED driving voltage-.

The controller may be further configured to identify the first LED driving voltage based on whether the first voltage is equal to or less than the reference value.

The second voltage may correspond to a preset voltage.

The controller may be further configured to identify, based on the image data, a second LED, from among the plurality of LEDs, to be driven at the second voltage.

Each of the plurality of driving ICs may be further configured to control a cathode voltage of the corresponding group of the plurality of LEDs, and the controller may be further configured to control an anode voltage of the plurality of LEDs and control the plurality of driving ICs.

The controller may be further configured to control the anode voltage of the plurality of LEDs based on the second voltage.

The controller may be further configured to identify a driving IC to control the cathode voltage of the first LED, from among the plurality of driving ICs, based on the image data, and cease control of the anode voltage of the first LED while controlling the cathode voltage of the first LED using the driving IC.

The controller may be further configured to identify the first LED driving voltage as the second voltage based on a screen off signal.

The LED module may be one from among a plurality of LED modules provided in an LED module array, and the controller may be further configured to identify a black LED module, from among the plurality of LED modules, based on the image data indicating driving voltages of each LED of the black LED module as being below the reference value, and apply the second voltage to LEDs of the black LED module.

The controller may be further configured to generate a control signal to drive the first driving IC.

According to an aspect of the disclosure, a method of driving a display device including light emitting diodes (LEDs) and a driving integrated circuit (IC) configured to apply a voltage to a group of the LEDs, includes: receiving image data; identifying a first LED driving voltage to be applied to a first LED from among the LEDs based on analysis of the image data and a reference value; and controlling the driving IC based on the first LED driving voltage.

The identifying may include: identifying a first voltage corresponding to the first LED based on the image data; identifying the first voltage as the first driving voltage based on the first voltage being greater than the reference value; and identifying a second voltage as the first LED driving voltage based on the first voltage being equal to or less than the reference value.

The second voltage may correspond to a preset voltage.

The identifying may include identifying, based on the image data, a second LED, from among the plurality of LEDs, to be driven at the second voltage.

The controlling may include: controlling an anode voltage of the first LED; and controlling the driving IC to control a cathode voltage of the LED.

The controlling of the anode voltage may include controlling the anode voltage to a preset voltage.

The controlling may include: identifying to control the cathode voltage of the first LED based on the image data;

and ceasing control of the anode voltage of the first LED while controlling the driving IC.

The identifying may include identifying a second voltage as the first LED driving voltage to be applied to the first LED based on a screen off signal.

The LEDs may be included in an LED module that is one from among a plurality of LED modules provided in an LED module array, and the controlling may include: identifying a black LED module, from among the plurality of LED modules, based on the image data indicating driving voltages of each LED of the black LED module as being below the reference value; and applying a second voltage to LEDs of the black LED module.

The controlling may include generating a control signal to drive the driving IC based on the first LED driving voltage.

According to an aspect of the disclosure, a display device includes: a plurality of light emitting diodes (LEDs); a driving integrated circuit; and a timing controller configured to. The timing controller is configured to: identify a first voltage based on image data corresponding to a first LED from among the plurality of LEDs; compare the first voltage with a reference voltage; identify the first voltage as a first LED driving voltage based on the first voltage exceeding the reference voltage; identify a preset voltage as the first LED driving voltage based on the first voltage being less than or equal to the reference voltage; and control the first LED and the driving integrated circuit based on the first LED driving voltage.

The timing controller may be further configured to identify a driving voltage for each of the plurality of LEDs based on a comparison of the reference voltage and a corresponding voltage, from among a plurality of voltages, identified based on the image data.

The timing controller may be further connected to an anode of the first LED and the driving integrated circuit is connected to a cathode of the first LED.

According to an aspect of the disclosure, a non-transitory computer readable recording medium having embodied thereon a program, which when executed by a processor of a display device, causes the display device to execute a method, the method including: identifying a first voltage based on image data corresponding to a first LED from among a plurality of LEDs; comparing the first voltage with a reference voltage; identifying the first voltage as a first LED driving voltage based on the first voltage exceeding the reference voltage; identifying a preset voltage as the first LED driving voltage based on the first voltage being less than or equal to the reference voltage; and controlling the first LED based on the first LED driving voltage.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
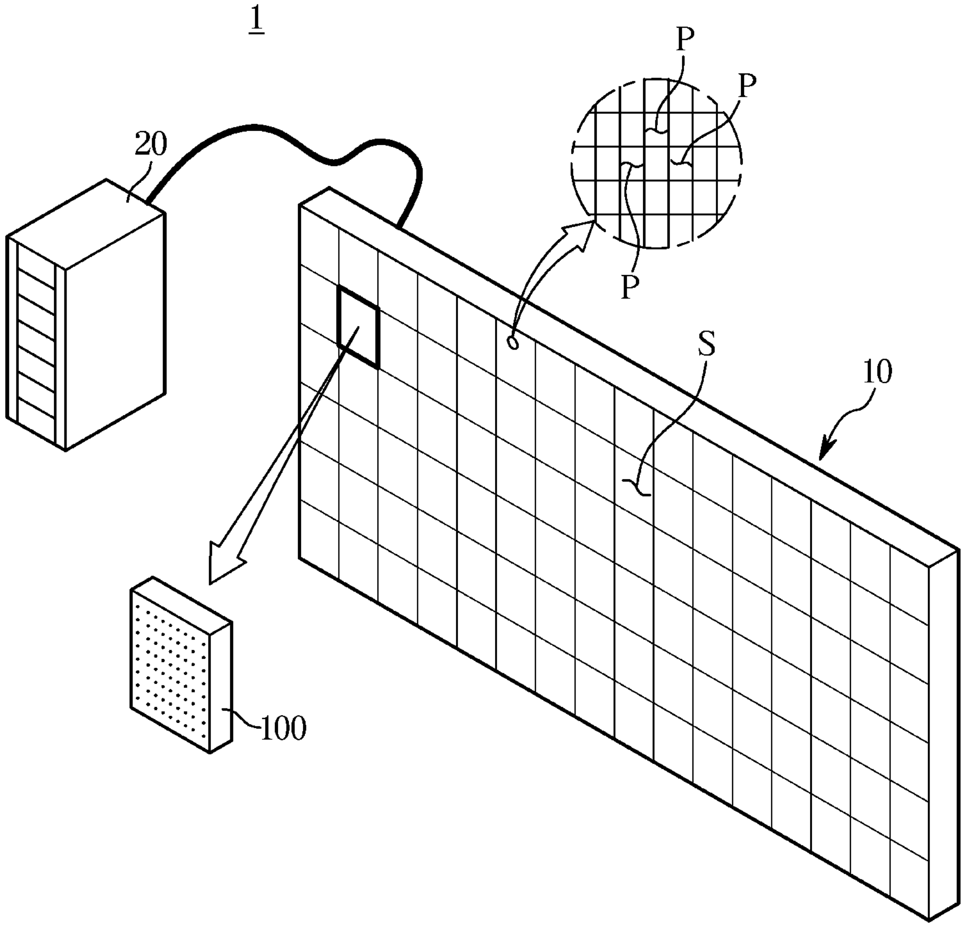
FIG. 1 is an exterior view of a display system, according to an embodiment.

Embodiments will now be described with reference to accompanying drawings.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc., may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Figure 2:
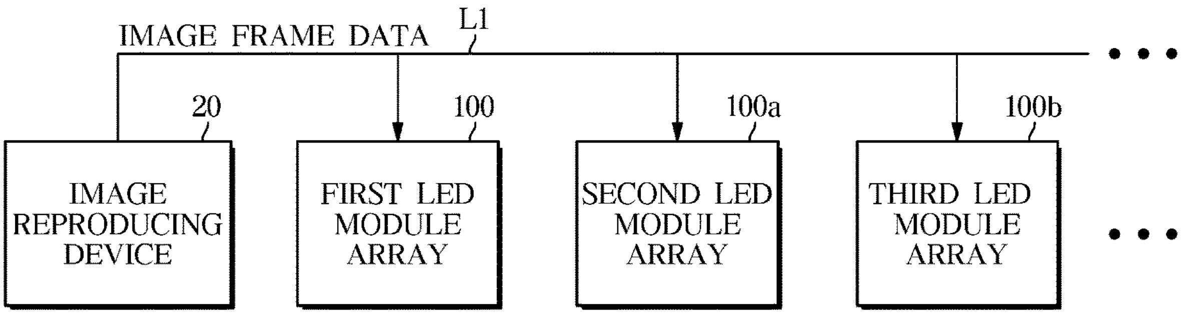
FIG. 2 shows a schematic arrangement and signal flows in a display system, according to an embodiment.

FIG. 1 is an exterior view of a display system, according to an embodiment. FIG. 2 shows a schematic arrangement and signal flows in a display system, according to an embodiment.

Referring to FIGS. 1 and 2, a display system 1 may include a display device 10 that visually presents an image and an image reproducing device 20 that provides image data to the display device 10.

The display system 1 may be used as a big screen in theaters, as a general display device, such as in televisions (TVs) and monitors, or for a large billboard. The display system 1 may installed outdoors, e.g., on the rooftop of a building or at a bus stop. However, the display system 1 may be installed indoors, e.g., at subway stations, shopping malls, theaters, offices, stores, etc.

The display device 10 may include a plurality of light emitting diode (LED) module arrays 100. Each LED module array 100 may include LEDs to provide a particular resolution. When a relatively large pitch size is provided between the LEDs, the display device 10 may be used for an information transferring device, such as a large billboard. On the contrary, when a relatively small pitch size, such as on the scale of micrometers (m), is provided between the LEDs, the display device 10 may be used for a high resolution screen in a theater as well as TVs.

The plurality of LED module arrays 100 may be arranged in rows and columns. In other words, the LED module arrays 100 may be arranged in the form of a matrix, for example, in a 16×6 matrix with 16 columns and six rows.

The plurality of LED module arrays 100 arranged in a matrix may be integrated into a single screen S. The integrated LED module arrays 100 may be controlled to display an image.

Each LED in the plurality of LED module arrays 100 may correspond to a unit pixel P, and an image may be formed by a combination of light emitted from the plurality of pixels P. For example, the plurality of pixels P may emit light with various brightnesses and colors, and the light emitted by the plurality of pixels P may be combined into an image that may be perceived by a viewer.

The screen S may include a variable number of LEDs corresponding to various resolutions. For example, to have 4K resolution according to Digital Cinema Initiatives (DCI), the screen S may include 4096×2160 LEDs. In another example, to have 4K ultra high definition (UHD) resolution according to the International Telecommunication Union (ITU), the screen S may include 3840×2160 LEDs. Specifically, when each unit pixel P of the screen S having the 4K resolution includes a red LED, a blue LED, and a green LED, the number of LEDs corresponding to the 4K resolution may be 4096×2160×3 or 3840×2160×3. When each LED corresponding to the unit pixel P is a single LED chip, which is an encapsulation of red, blue, and green LEDs, the number of LEDs corresponding to the 4K resolution may be 4096×2160 or 3840×2160.

The image reproducing device 20 may store content, such as a video, or may receive the content from an external content source (e.g., a video streaming service server). For example, the image reproducing device 20 may store a file of content data in a storage, or receive content data from the external content source in real time.

The image reproducing device 20 may decode the stored or received content data into image frame data (hereinafter, image data). For example, a broadcast signal or content data may be compressed according to various video compression standards, such as Moving Picture Experts Group (MPEG), High Efficiency Video Coding (HEVC), etc. The image reproducing device 20 may restore the image data representing each image frame from the compressed content data.

The image reproducing device 20 may send the restored image data to the display device 10.

Referring to FIG. 2, there may be image data lines, such as image data line L1, between the image reproducing device 20 and the plurality of LED module arrays 100, 100*a*, 100*b*, and the image reproducing device 20 may send the image frame data to the plurality of LED module arrays 100, 100*a*, 100*b* through the image data lines. FIG. 2 illustrates a single image data line L1. However, embodiments are not limited thereto, and one or more embodiments may include additional image data lines to connect LED module arrays to the image reproducing device 20.

The plurality of LED module arrays 100, 100*a*, 100*b* may also receive image frame data from the image reproducing device 20 through the image data lines, and display an image corresponding to the received image data.

Upon reception of the image data, the plurality of LED module arrays 100, 100*a*, 100*b* may each display a portion of an image to be displayed on the entire screen S. Specifically, each of the plurality of LED module arrays 100, 100*a*, 100*b* may occupy a certain area on the screen S and output a portion of the entire image corresponding to where the LED module array is arranged.

For example, the image reproducing device 20 may send image data of the entire image to each of the plurality of LED module arrays 100, 100*a*, 100*b*, which may in turn extract portions of the image data of the entire image corresponding to the location of the particular LED module array, and display images corresponding to the image data that is extracted according to the locations of the LED module arrays 100, 100*a*, 100*b*. In another example, the image reproducing device 20 may divide the image data into a plurality of sub image frame data and send the plurality of sub image frame data to corresponding LED module arrays 100, 100*a*, 100*b*, each of which may, in turn, display an image corresponding to the sub image frame data.

Figure 3:
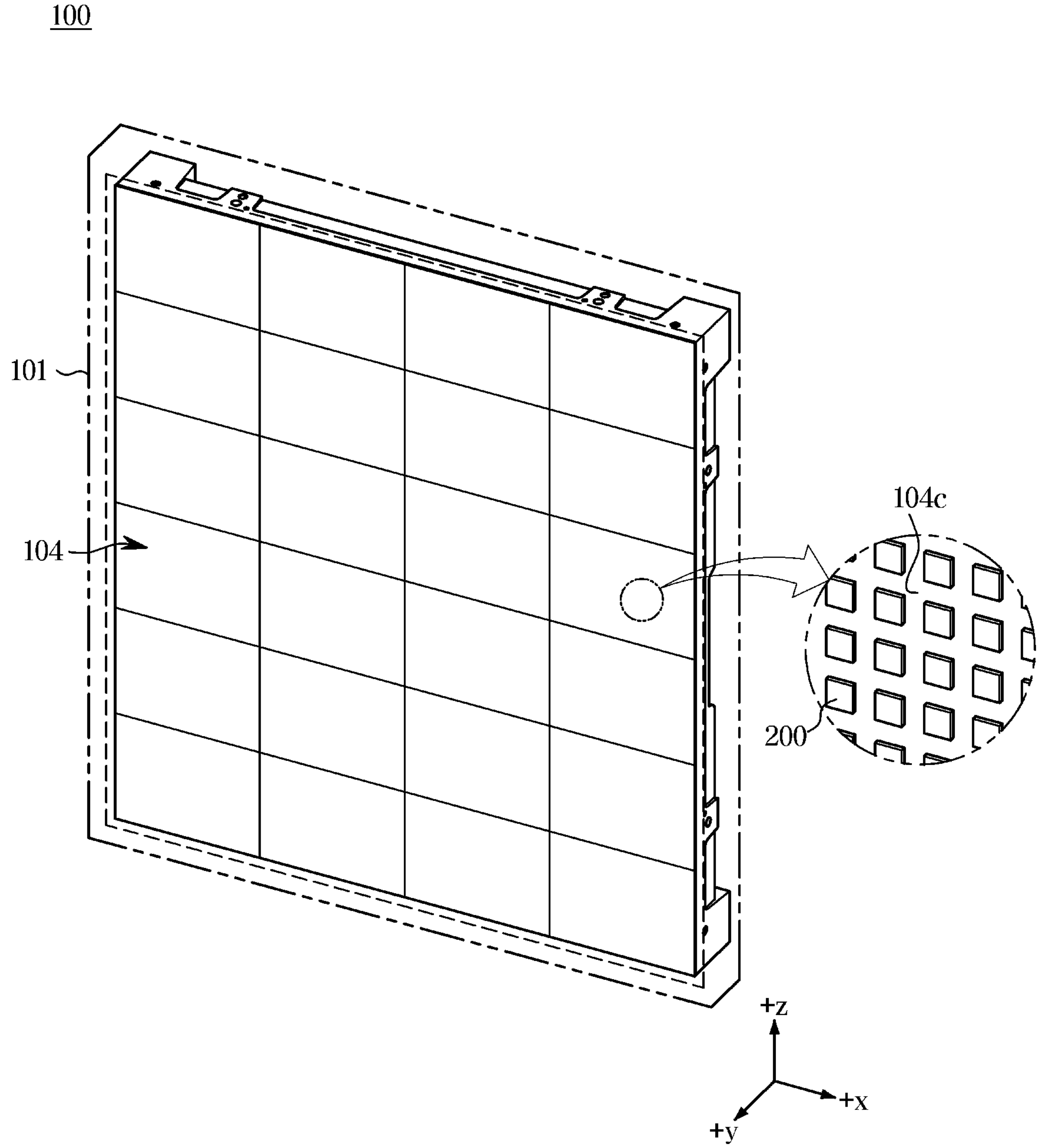
FIG. 3 is a front view of a light emitting diode (LED) module array, according to an embodiment.
Figure 4:
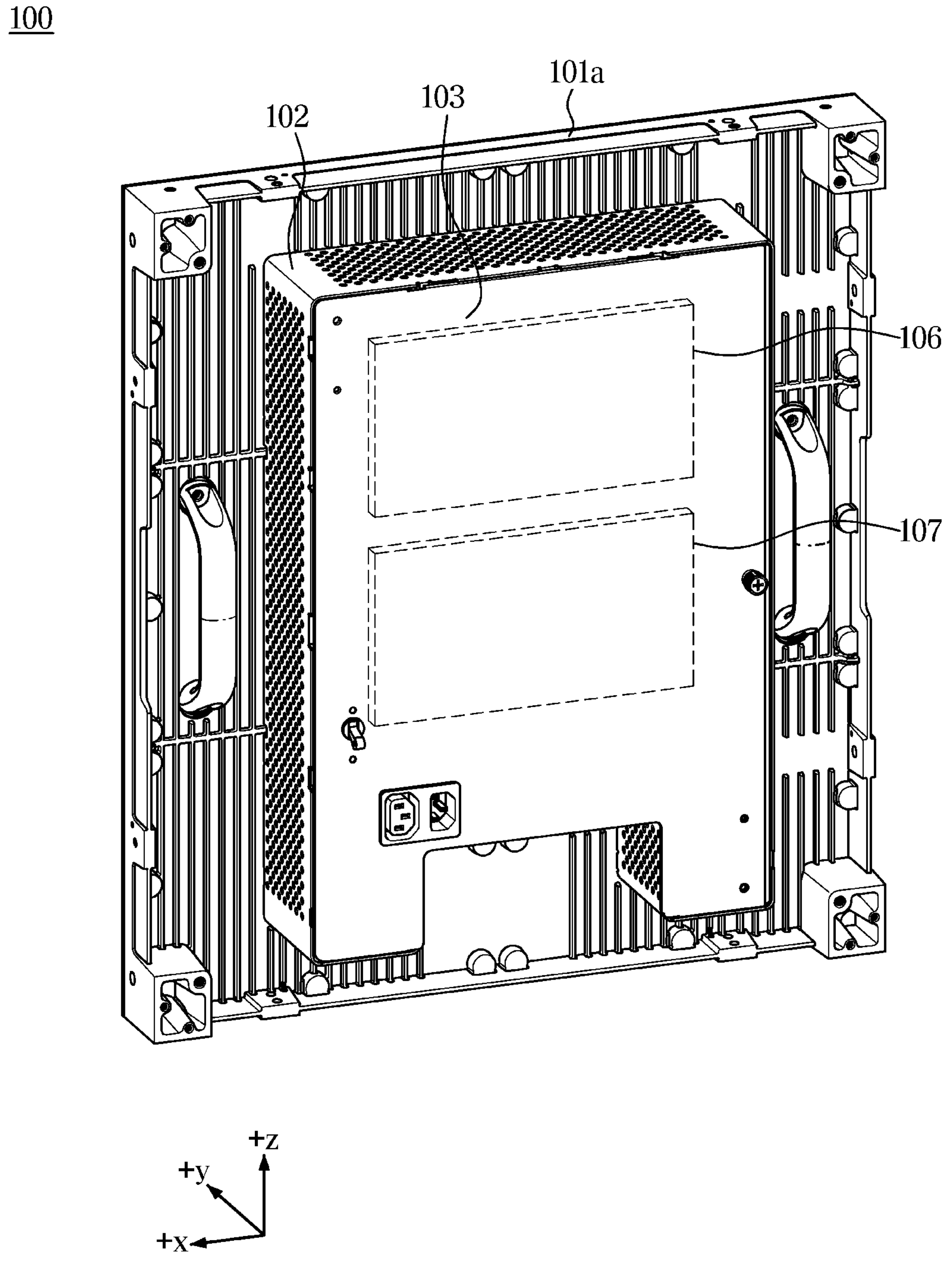
FIG. 4 is a rear view of an LED module array, according to an embodiment.
Figure 5:
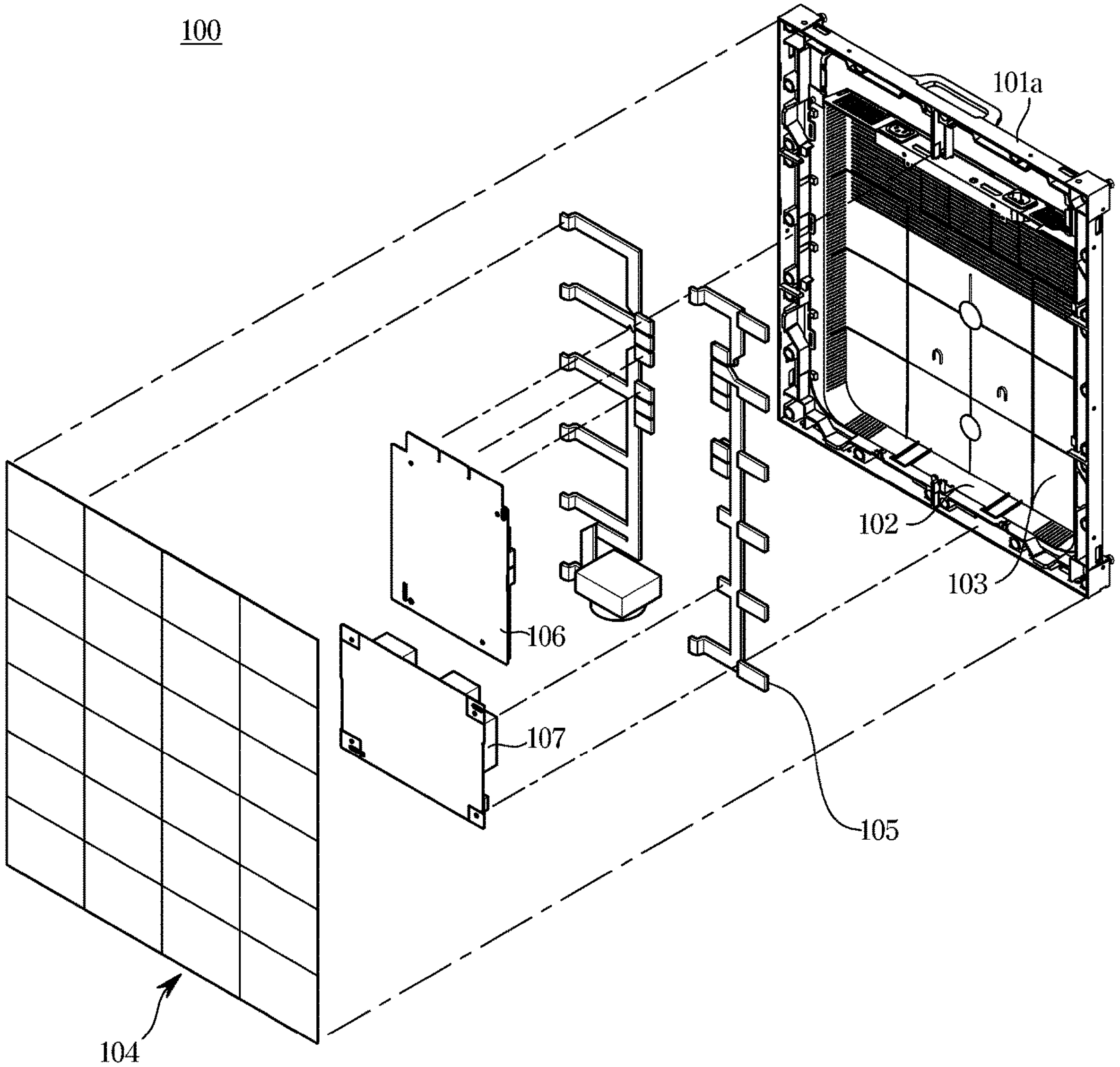
FIG. 5 is an exploded view of an LED module array, according to an embodiment.

FIG. 3 is a front view of an LED module array, according to an embodiment. FIG. 4 is a rear view of an LED module array, according to an embodiment. FIG. 5 is an exploded view of an LED module array, according to an embodiment.

Referring to FIGS. 3, 4, and 5, a cabinet 101 of the LED module array 100 may include constituent parts to display an image I on the screen S.

The LED module array 100 may include LED modules 104 to emit light in the forward direction to generate an image, a control assembly 106 to control the LED modules 104, a power assembly 107 to supply power to the LED modules 104 and the control assembly 106, and a chassis 105 to support/fix LED modules 104, the control assembly 106 and the power assembly 107.

There may be a plurality of LED modules 104 in the LED module array 100. In an embodiment, the LED module array 100 may include multiple LED modules 104 arranged in a 4×6 matrix. The LED module array 100 is not, however, limited thereto, and the number and arrangement of the LED modules may be variously modified.

The LED module 104 may include a plurality of LEDs 200 mounted on a module substrate 104*c*, and for example, the plurality of LEDs 200 may be arranged in the form of a matrix.

The LED 200 is a semiconductor device that emits light with preset wavelength when power is supplied thereto. Similar to the normal diode, the LED 200 has also polarities, the anode and the cathode, and emits light when a voltage across the anode and the cathode is equal to or greater than a preset level.

The plurality of LEDs 200 may emit light with different colors and different brightnesses. In an embodiment, the LED 200 may emit light with different wavelengths (different colors) depending on the constituent material. For example, when the LED 200 includes aluminum gallium arsenide (AlGaAs), gallium arsenide phosphide (GaAsP), gallium phosphide (GaP), etc., the LED 200 may emit red light of about 620 nm to about 750 nm; when the LED 200 includes indium gallium nitride (InGaN), the LED 200 may emit green light of about 495 nm to about 570 nm; when the LED 200 includes gallium nitride (GaN), the LED 200 may emit blue light ray about 450 nm to about 495 nm. The LED 200 may emit various wavelengths of light such as white light other than the aforementioned wavelengths.

The plurality of LEDs 200 may include red LEDs that embody red sub pixels (PRs), green LEDs that embody green sub pixels (PGs), and blue LEDs that embody blue sub pixels (PBs). A red LED, a green LED, and a blue LED may be integrated into the single pixel P, and may be repeatedly arranged.

Furthermore, the plurality of LEDs 200 may emit light with different intensities depending on the magnitude of a current applied. For example, as the current applied increases, the plurality of LEDs 200 may emit light with higher intensities.

An image may be formed by a combination of light emitted from the plurality of LEDs 200. For example, an image may be formed by a combination of red light emitted from red LEDs, green light emitted from green LEDs, and blue light emitted from blue LEDs.

The control assembly 106 may include a timing controller (TCON) and other various control circuits for controlling operation of the LED module 104.

The timing controller (see FIG. 8) may process an image signal into image data, and control a plurality of driving integrated chips (ICs) (see FIG. 8) and LEDs mounted on the module substrate 104*c*. The driving IC is a semiconductor that converts control image data into an analog value to directly drive an LED. The control image data may be based on a digital signal. The timing controller and driving ICs will be described later in more detail in connection with other drawings.

The power assembly 107 supplies stable power to the LED modules 104 in order for the plurality of LEDs 200 to emit light with different colors and different brightnesses. For example, the power assembly 107 may include a switching mode power supply (SMPS) for supplying power to the control assembly 107 and driving ICs by switching operations.

The control assembly 106 and the power assembly 107 may be implemented with printed circuit boards (PCBs) and various circuits mounted on the PCBs. For example, a power circuit may include a power circuit board, and a capacitor, a coil, a resistor, a microprocessor, etc., which are mounted on the power circuit board. The timing controller may also include a control circuit board, and a memory and a microprocessor mounted on the control circuit board.

The cabinet 101 may include a front bracket 101*a*, a frame bracket 102, and a rear cover 103, and the front bracket 101*a*, the frame bracket 102, and the rear cover 103 may support and accommodate the LED modules 104, the control assembly 106, and the power assembly 107.

The front bracket 101*a* may support the LED modules 104. The frame bracket 102 may be located on the rear surface of the front bracket 101*a* to accommodate the control assembly 106 and the power assembly 107. The rear cover 103 may be detachably connected to the frame bracket 102 to provide access to the cabinet 101.

The chassis 105 may support the control assembly 106 and the power assembly 107. For example, the control assembly 106 and the power assembly 107 may be fixed to the chassis 105, and the chassis 105 may be fixed to the rear surface of the front bracket 101*a*.

The mechanical structure of the LED module array 100 is not, however, limited to the aforementioned descriptions and drawings. For example, it is enough for the LED module array 100 to include the plurality of LED modules 104, the control assembly 106 for controlling the LED modules 104, and the power assembly 107, and other components may be optionally included in the LED module array 100.

Figure 6:
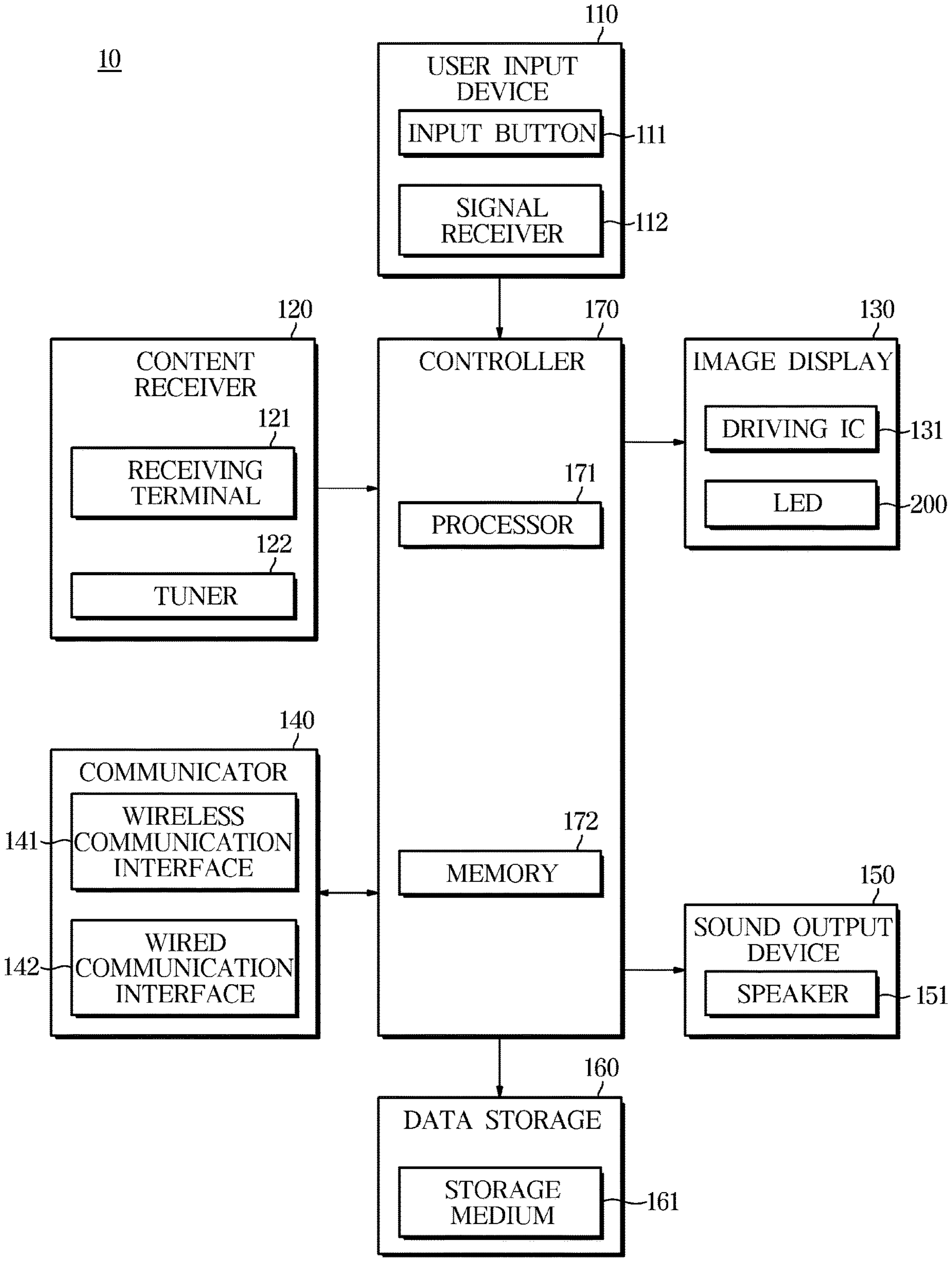
FIG. 6 is a control block diagram of a display device, according to an embodiment.
Figure 7:
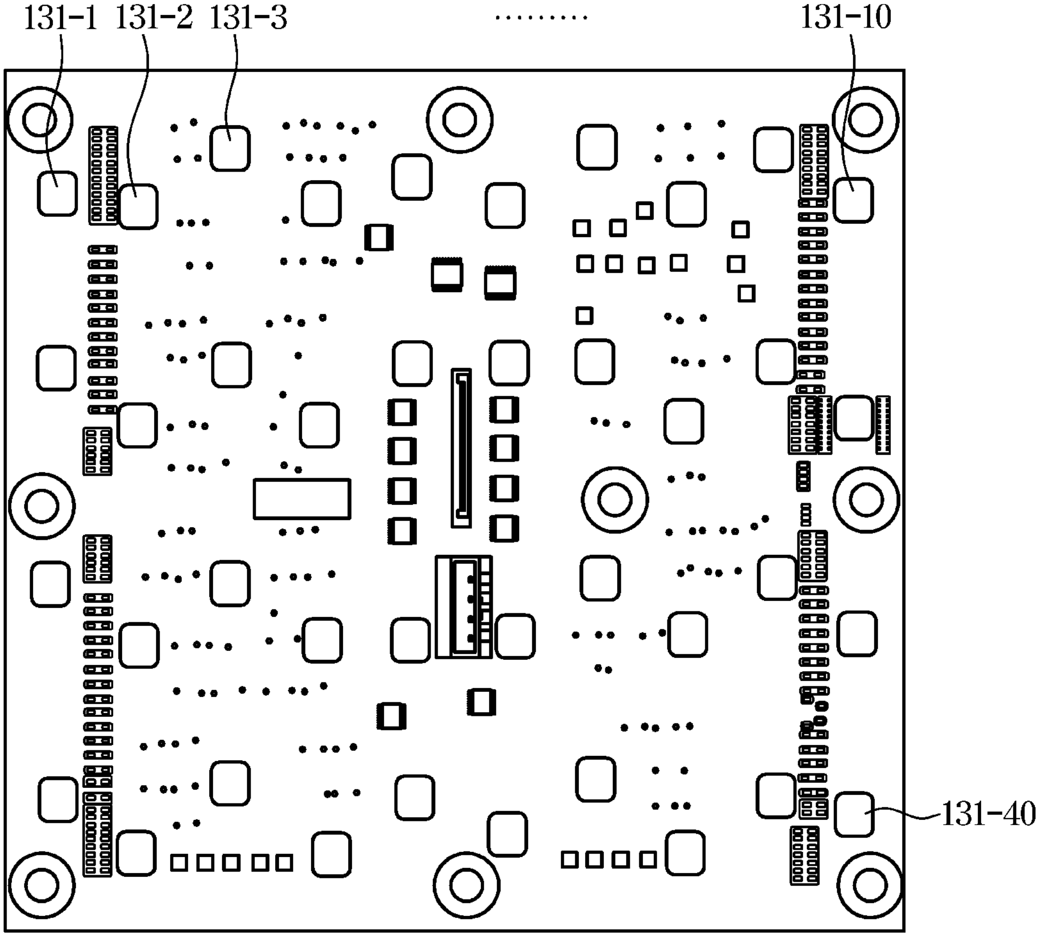
FIG. 7 is a schematic diagram of a rear surface of an LED module, according to an embodiment.
Figure 8:
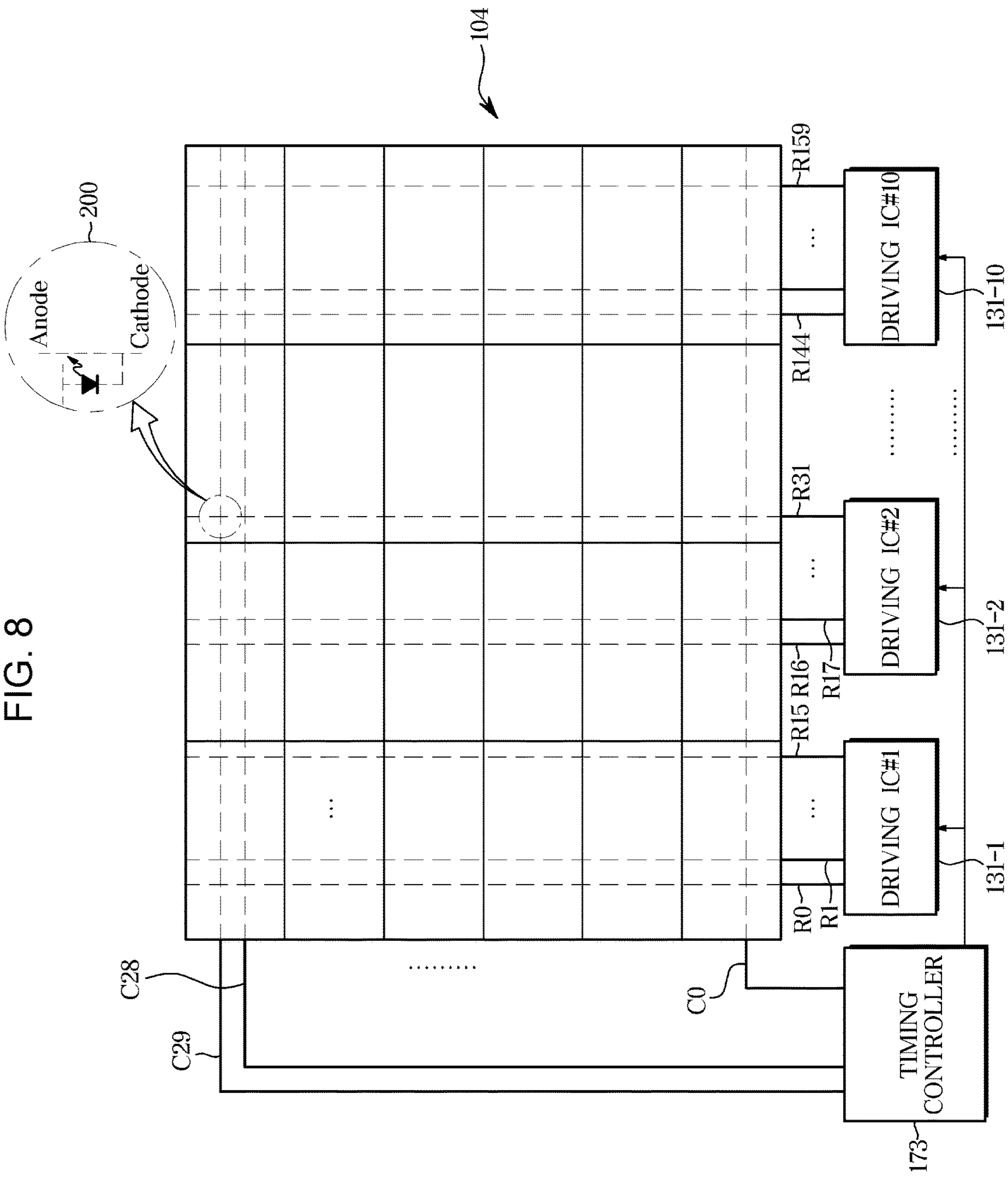
FIG. 8 is a block diagram of an LED module, according to an embodiment.

FIG. 6 is a control block diagram of a display device, according to an embodiment. FIG. 7 schematically shows a rear surface of an LED module, according to an embodiment. FIG. 8 represents an area of an LED module according to an embodiment. As shown, the LED module includes control blocks. The embodiment will be described in connection with FIGS. 6 to 8 together to avoid overlapping explanation.

Referring to FIG. 6, the display device 10 may include a user input device 110 for receiving a user input from the user, a content receiver 120 for receiving a video signal and/or an audio signal (or collectively, an image signal) from content sources, an image display 130 for displaying an image, a communicator 140 for communicating with external devices, a sound output device 150 for outputting sound, a data storage 160 for storing various programs and data, and a controller 170 for controlling operations of the display device 10.

The user input device 110 may include an input button 111 for receiving a user input, and a signal receiver 112 for receiving a remote control signal from a remote controller. For example, the user input device 110 may include a power button for soft turn-on (operation start) or soft turn-off (operation stop) of the display device 10, a sound control button to control sound volume output by the display device 10, a source selection button to select a content source, etc.

The input button 111 may receive a user input, generate an electric signal corresponding to the user input, and send the electric signal to the controller 170. The input button 111 may be implemented with various input devices such as a push switch, a touch switch, a dial, a slide switch, a toggle switch, etc.

The remote controller may be provided separately from the display device 100, and may receive a user input and send a radio signal corresponding to the user input to the display device 10. The signal receiver 112 may receive a radio signal corresponding to a user input from the remote controller, generate an electric signal corresponding to the user input, and send the electric signal to the controller 170.

The content receiver 120 may include receiving terminal 121 and a tuner 122 for receiving an image signal including a video signal and/or an audio signal from the content sources. According to one or more embodiments, the content receiver 120 may include a plurality of receiving terminals 121.

The receiving terminals 121 may receive a video signal and an audio signal from the content sources through a cable. For example, the receiving terminals 121 may include a component (YPbPr/RGB) terminal, a composite video blacking and sync (CVBS) terminal, an audio terminal, a high definition multimedia interface (HDMI) terminal, a universal serial bus (USB) terminal, etc.

The tuner 122 may receive broadcast signals through an antenna or a cable, and extract a broadcast signal corresponding to a channel selected by the user among the received broadcast signals. For example, the tuner 122 may pass a broadcast signal having a frequency corresponding to a channel selected by the user among the plurality of broadcast signals received through the antenna or the cable, and block other broadcast signals having different frequencies.

As such, the content receiver 120 may receive an image signal from the content sources through the receiving terminal 121 and/or the tuner 122, and send the image signal to the controller 170. The controller 170 may analyze/process the image signal and then convert the image signal to image data, as will be described later.

The image display 130 may include driving ICs 131 for converting image data to an analog signal, and the plurality of LEDs 200 driven by the driving ICs 131.

In an embodiment, the LED module 104 may include 10×4 driving ICs 131. Referring to FIG. 7, first to 40th driving ICs 131-1 to 131-40 may be mounted on the PCB provided on the rear surface of the LED module 104.

Referring to FIG. 8, the first driving IC 131-1 of a first column may control a first line of LEDs 200 including 16×30 LEDs 200. Specifically, the first driving IC 131-1 may apply a voltage to the cathode of LEDs 200 included in the first line through output lines RO to R15. The second driving IC 131-2 may apply a voltage to the cathode of LEDs 200 included in the second line through output lines R16 to R31. The tenth driving IC 131-10 may apply a voltage to the cathode of LEDs 200 included in the tenth line through output lines R144 to R159.

The timing controller 173 may apply a voltage to anodes of the LEDs 200 through output lines C0 through C29. A voltage applied to the anode of the LEDs 200 included in each line may be determined by the timing controller 173 arranged in the control assembly 106. The anode of the LEDs 200 may be connected to the timing controller 173, and the cathode of the LEDs 200 may be connected to the driving ICs 131.

The timing controller 173 may determine a voltage to be applied to the anode of the LEDs 200 included in each line while controlling the driving ICs 131 based on the analyzed image data. When a difference in voltage between the anode of the LED 200 and the cathode of the LED 200 applied by the driving IC 131 is equal to or greater than a preset voltage, the LED 200 emits light.

The function of the driving IC 131 controlling the voltage applied to the cathode of the LEDs 200 included in each line is a charging operation, and the function of the timing controller 173 controlling the voltage applied to the anode of the LEDs 200 included in the LED module 104 is a discharging operation. The display device 10 may attain enhanced image quality by controlling the voltage at the cathode using the driving ICs 131.

A criterion for controlling voltages at both terminals of the LED 200 may take diode and circuit characteristics into account. Specifically, when the charging and discharging operations are performed by taking into account the circuit characteristics, a reverse voltage may occur across the LED 200 when image data including a black image or low gray scale image value is input. Hence, after analyzing the image data, the display device 10 may apply a new voltage that may reduce stress to some LEDs 200 across which the reverse voltage is likely to occur. This will be described later in more detail with reference to other drawings.

The aforementioned operations of the driving IC 131 and the timing controller 173 correspond to a passive matrix (PM) driving method for controlling the LEDs 200 line by line. However, embodiments are not limited to the PM driving method, and an active matrix (AM) driving method may be used by the display device 10 for controlling the LEDs 200 individually. Specifically, when employing the AM driving method, the display device 10 may include driving ICs for driving LEDs individually, the number of LEDs being preset according to a resolution, and a controller for analyzing received image data to determine a first voltage for the LED to emit light, determining a second voltage applied to the LED based on the first voltage and a reference value, and controlling the driving IC based on the second voltage.

The communicator 140 may exchange data with external devices other than the display device 10. For example, the communicator 140 may exchange data with a user equipment or other electronic devices.

The wired communication interface 141 may access a wired communication network and communicate with an external device over the wired communication network. For example, the wired communication interface 141 may access a wired communication network through Ethernet, the IEEE 802.3 technology standard, and receive data from external devices over the wired communication network.

The wireless communication interface 142 may communicate wirelessly with a base station or an access point (AP), and access the wired communication network via the base station or the AP. The wireless communication interface 142 may communicate with external devices connected to the wired communication network via the base station or the AP. For example, the wireless communication interface 142 may use WiFi™, the IEEE 802.11 technology standard, to communicate with an AP, or use code divisional multiple access (CDMA), wideband code division multiple access (WCDMA), Global Systems for Mobile communications (GSM), Long Term Evolution (LTE), WiBro, etc., to communicate with a base station. The wireless communication interface 142 may receive data from the external devices via the base station or the AP.

In addition, the wireless communication interface 142 may communicate directly with the external device, such as a UE. For example, the wireless communication interface 142 may use Wireless Fidelity (Wi-Fi), Bluetooth™, which is the IEEE 802.15.1 technology standard, ZigBee™, which is the IEEE 802.15.4 technology standard, etc., to wirelessly receive data directly from the external device.

The sound output device 150 may include a speaker 151 for outputting sound in an audible signal or sound waves.

The speaker 151 may convert an analog sound signal amplified by an amplifier to a sound or sound waves. For example, the speaker 151 may include a thin film that vibrates according to an electric sound signal, and the vibration of the thin film may generate sound waves.

The data storage 160 may include a storage medium for storing a program and data for controlling the operation of the display device 10. The program may include a plurality of instructions containing a code made by a compiler or a code executable by an interpreter, which when executed by a processor of the display device, control the display to device to perform a particular function, and the data may be processed according to the plurality of instructions included in the program.

The storage medium 161 may store content data in a file format. For example, the storage medium 161 may store the content data in the form of "*.mpg", "*.avi", "*.asf", or "*.mp4" file, and provide the content data to the controller 170 in response to a readout instruction from the controller 170.

For example, the storage medium 161 may store an image signal input from the content receiver 120 and/or the communicator 140, and provide the stored image signal for the controller 170 to process image data. In another example, the storage medium 161 may receive and store the image data processed by the controller 170.

The storage medium 161 may store the program and/or data electrically, magnetically, or optically. For example, the storage medium 161 may include a solid state drive (SSD), a hard disc drive (HDD), an optical disc drive (ODD), or the like.

The controller 170 may include one or more memories 172 for memorizing/storing a program/data, and one or more processors 171 for processing the data according to the program. The controller 170 may include hardware, such as the memory 172 and the processor 160, and software, such as the program and/or data memorized/stored in the memory 171 and/or the data storage 160.

The memory 172 may store a program and data for controlling the components included in the display device 10. For example, the memory 172 may store instructions that contain a code made by a compiler or a code executable by an interpreter to be executed by processor 171.

The memory 172 may temporarily store data provided from the components of the display device 10. For example, the memory 172 may store a user input received through the user input device 110, image data received through the content receiver 120, communication data received through the communicator 140, data stored in the data storage 160, etc.

The memory 172 may include a non-volatile memory, such as a Read Only Memory (ROM), a flash memory, and/or the like, which may store data for a long period, and a volatile memory, such as a static random access memory (SRAM), a dynamic RAM (DRAM), or the like, which may temporarily store data.

The processor 171 processes the data stored in the memory 172 according to the program (or a series of programs) stored in the memory 172. For example, the processor 171 may process the user input, the image data, the communication data, the stored data, etc., according to the program stored in the memory 172. Furthermore, the processor 171 may generate a control signal to control at least one of the image display 130, the communicator 140, or the data storage 160 based on a result of processing the data.

The processor 171 may include an operation circuit for performing a logic operation and an arithmetic operation, and a memory circuit for storing the data resulting from the operation.

As such, the controller 170 may process the data obtained from the components included in the display device 10 and control the components.

Specifically, the controller 190 may control operations of the display device 10 based on user inputs received through the user input device 110. For example, the controller 170 may supply power to the image display 130 and send the processed image data to the image display 130, in response to a user input to initiate operation (turn-on operation). Furthermore, the controller 170 may stop sending the image data to the image display 130 and block the power to the image display 130, in response to a user input to stop operation (turn-off operation).

The controller 170 may analyze an image signal (a TV broadcast signal, streaming data, etc.) received through the content receiver 120 or stored in the data storage 160 and convert the image signal to image frame data (hereinafter, image data). For example, the controller 190 may obtain a compressed/encoded image signal from the content receiver 120 and/or the data storage 160, and decode the compressed/encoded image signal to image data.

The controller 170 may analyze the image data, and then determine an LED 200 to emit light and a particular voltage value for the LED 200 to emit light based on the image data. The controller 170 may determine a voltage (hereinafter, a first voltage) for the LED 200 based on the particular voltage value, and then output a control signal corresponding to the first voltage to the driving IC 131. The image display 130 may apply a voltage to the LED 200 to control light emission according to the control signal from the controller 170.

The controller 170 may compare the first voltage determined by analyzing the image data with a preset reference value to determine whether to control the image display 130 at the first voltage. When the image data is a black image or includes a low grayscale that is less than a reference value, the controller 170 may control the display 130 at a preset voltage (hereinafter, a second voltage) instead of the first voltage. This enables the controller 170 to reduce the stress on some of the LEDs 200 displaying image data in the LED module 104 or in the LED module array 100 and prevent LED damage and line defect, which will be described later.

The processor 171 and the memory 172 may be implemented separately with a plurality of semiconductor devices or integrated in a single semiconductor device.

The timing controller 173 as described above in connection with FIGS. 3 to 5 may be an example of the controller 170. In another embodiment, the timing controller 173 may be provided in each LED module 104 included in the display device 10. In this case where the timing controller 173 is provided in the plural, a separate processor may be provided to analyze image data and collectively control the respective timing controllers 173.

The display device 1 may further include a component for performing an additional function in addition to the aforementioned components as shown in FIG. 6, or may leave out one or more of the aforementioned components, as needed.

Figure 9:
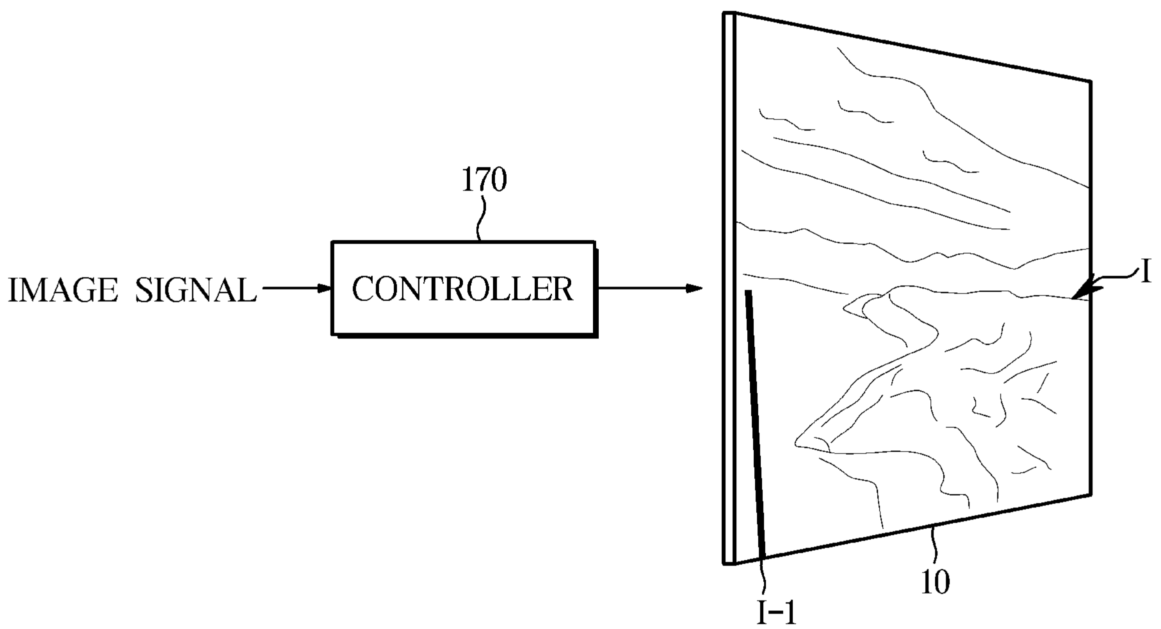
FIG. 9 is a depiction for explaining a possible problem occurring in a display device.

FIG. 9 is a depiction for explaining a possible problem occurring in a display device.

In the display device 10, the controller 170 analyzes an image signal and controls the LED 200 emit light based on the analyzed image data. The display device 10 may control the voltage across both terminals of the LED 200 by the aforementioned discharging and charging operations. Such voltage control may be determined by taking into account characteristics of the LED 200 and associated circuits.

However, image data in some areas of the image I displayed on the display device 10 may have a voltage that is less than a certain level. Specifically, when the display device 10 includes the plurality of LED module arrays 100, some LED module arrays 100 located at either edge of the image I may output the black image. Furthermore, some of the continuously displayed images I may include black content on the entire screen.

Even when displaying the image data that is a black image, a related device performs steady discharging and charging operations, which may lead to a reverse voltage across the LED 200. The reverse voltage applied across the LED 200 causes stress. When the reverse voltage is continuously applied, the LED 200 has a continuous stress. Continuous stress may damage the LED 200, causing a vertical line corresponding to the damaged LEDs 200, for example line defect (I-1) as shown in FIG. 9, to appear on the display device 10. The line defect causes the LEDs to emit a large amount of light, and is noticeably visible in the black image or a low grayscale image. For example, the line defect occur in sub pixels of a certain color, and the line defect may appear in a corresponding color.

In order to reduce the stress on the LED 200 and prevent the line defect, the display device 10 identifies image data that has a grayscale lower than a preset reference value and applies the preset second voltage to the LED 200 driven to emit light for the identified image data.

Figure 10:
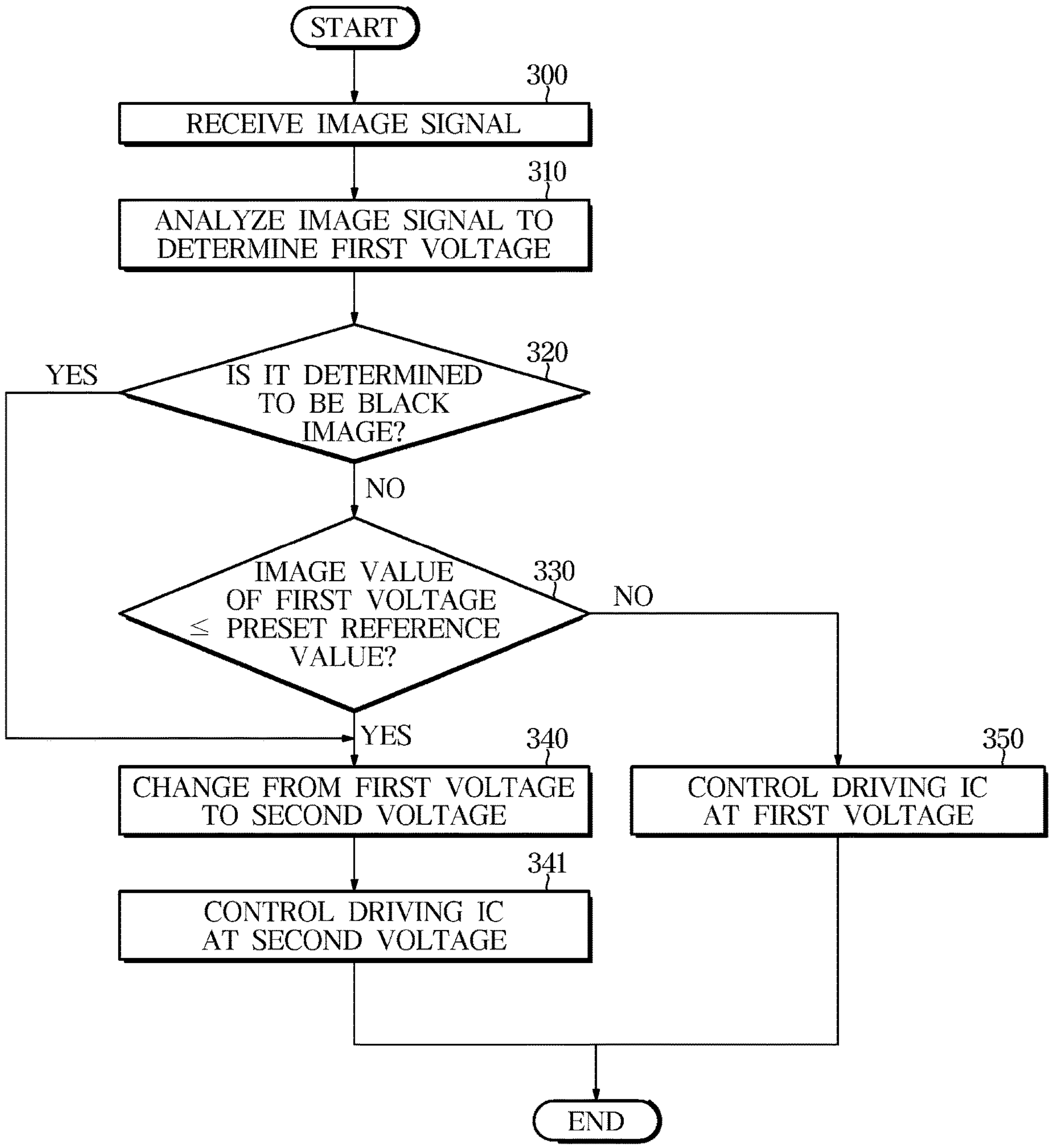
FIG. 10 is a flowchart illustrating a control method of a display device, according to an embodiment.

FIG. 10 is a flowchart illustrating a control method of a display device, according to an embodiment.

For example, the controller 170 may control the display device 10 to perform the control method illustrated in FIG. 10.

Referring to FIG. 10, the controller 170 receives an image signal, in operation 300. Specifically, the image signal received by the display device 10 may have various types, and for example, the image signal may be movie streaming data.

The controller 170 analyzes the image signal to determine a first voltage corresponding to the LED 200 in operation 310.

Specifically, the controller 170 may determine LEDs 200 included in the LED module 104 or the LED module array 100 in each frame of the image data, and determine an emission level of an LED 200 to emit light. As described above, the emission level of the LED 200 may be determined based on the voltage, and the voltage may be determined from the image data.

The controller 170 determines whether the image data includes a black image, in operation 320.

Of multiple frames corresponding to the image data, some frames may include the black image.

When the image data is the black image, the controller 170 changes the voltage applied to all the LEDs 200 included in the LED module 104 or the LED module array 100 to the second voltage, in operation 340. The controller 170 generates a control signal based on the second voltage, and controls the driving IC 131, in operation 341.

The second voltage may be preset, and may correspond to a forward voltage of the LED 200. By applying the second voltage, stress that may be imposed on the LED 200 due to a reverse voltage across the LED 200 may be reduced. The value of the second voltage is not changed depending on the image data. For example, the second voltage may have a value set by the manufacturer of the display device 10 in a manufacturing stage.

Alternatively, the value of the second voltage may be changed by the user input device 110.

When the image data is not the black image, the controller 170 compares the value of the first voltage and a preset reference value, in operation 330.

Specifically, the value of the first voltage is determined by analyzing the image data. The first voltage may be different for each LED 200 included in the LED module 104 or the LED module array 100. For example, even for one frame, the plurality of LEDs 200 may be divided into LEDs that display an image with content and LEDs that display a low grayscale image with no content. The LEDs that display a low grayscale image with no content may be usually located at edges of the screen S.

When the LEDs 200 emit light at a particular grayscale or less at the first voltage, the controller 170 changes the voltage to be applied to the LEDs 200 from the first voltage to the second voltage, in 340. The controller 170 generates a control signal based on the second voltage, and controls the driving IC 131, in operation 341.

On the other hand, when it is determined that the LED 200 does not display the black image and emits light at the first voltage that exceeds the preset reference value, the controller 170 controls the driving IC 131 based on the first voltage, in operation 350.

When the controller 170 controls the driving IC 131, a control signal may drive multiple LEDs 200 on each line, which may correspond to the charging operation. On the other hand, the controller 170 may control emission of the LED 200 not only through the driving IC 131 but directly control the LED 200 based on the second voltage by performing the discharging operation. This will be described later in more detail with reference to FIGS. 12 and 13.

Figure 11:
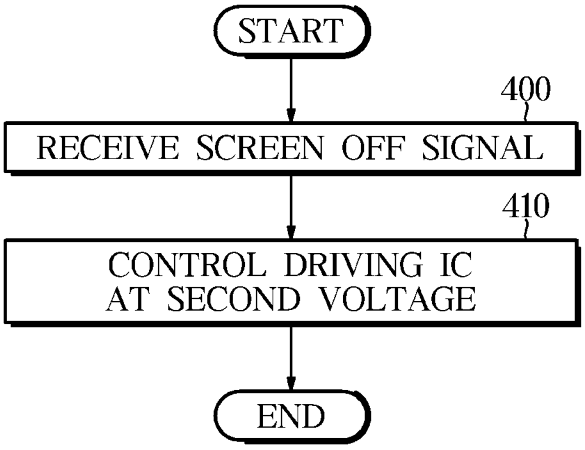
FIG. 11 is a flowchart illustrating a control method of a display device, according to another embodiment.

FIG. 11 is a flowchart illustrating a control method of a display device, according to another embodiment.

Referring to FIG. 11, the controller 170 receives a screen off signal in operation 400.

The screen off signal is a signal to prevent the LED 200 from emitting light, and may be used in a standby mode, a suspend mode, an off mode, etc., to minimize power consumption of the display device 10. The screen off signal may be received through the user input device 110 or generated by the controller 170 when a certain condition is met.

The LED 200 does not emit light in response to the screen off signal. However, a reverse voltage may be applied across the LED 200 due to the aforementioned charging and discharging operations.

Accordingly, in the disclosure, the controller 170 controls the driving IC 131 at the second voltage according to the screen off signal, for example when the screen off signal is received through the user input device 110 or generated by the controller 170 when the condition is met, in operation 410.

The display device 10 may apply the second voltage to the LED 200 based on various external signals other than the result of analysis of the image data, thereby reducing the stress and preventing damage to the LED 200.

Figure 12:
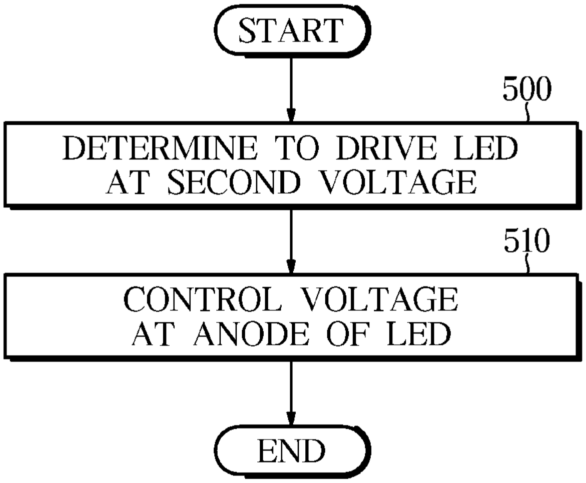
FIGS. 12 and 13 are flowcharts illustrating control methods of a display device, embodiments.
Figure 13:
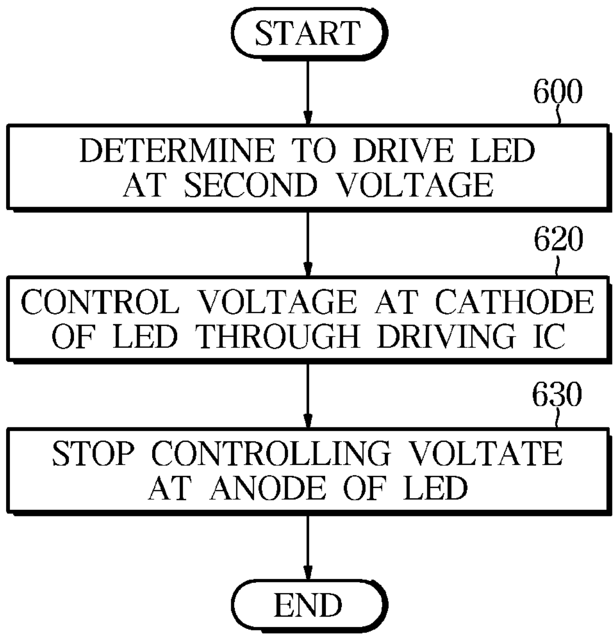

FIGS. 12 and 13 are flowcharts illustrating control methods of a display device, according to embodiments.

Referring to FIG. 12, the controller 170 determines to drive the LED 200 at the second voltage, in operation 500.

As described above in connection with FIGS. 10 and 11, the controller 170 may determine to drive the LED 200 at the second voltage based on different reasons such as a result of analysis of the image data or the screen off signal. In this case, the controller 170 may control the LED 200 at the second voltage in the following two examples.

First, the controller 170 applies the second voltage to the LED 200 by controlling a voltage at the anode of the LED 200, in operation 510.

As described above in connection with FIG. 8, when the timing controller 173 controls the voltage applied to the anode of the LED 200, the controller 170 applies the second voltage to the LED 200 by directly performing the discharging operation.

Alternatively, the controller 170 may apply the second voltage to the LED 200 by controlling a voltage at the cathode of the LED 200 through the driving IC 131. Referring to FIG. 13, the controller 170 determines to drive the LED 200 at the second voltage, in operation 600.

As described above in connection with FIG. 8, the driving IC 200 may control the voltage at the cathode of the LED 200. Accordingly, the controller 170 may apply the second voltage to the LED 200 by performing the charging operation through the driving IC 131, in operation 620.

Furthermore, the controller 170 stops controlling the voltage at the anode of the LED 200, in operation 630. For example, when the charging operation is used, the controller 170 may not perform the discharging operation that controls the voltage at the anode of the LED 200.

However, it is also possible for the controller 170 to apply the second voltage to the LED 200 while performing the charging operation and discharging operation together without the need to separate the charging operation from the discharging operation all the time.

According to the embodiments, a display device and control method thereof can control the magnitude of a voltage applied to an LED based on an input signal, thereby reducing the stress on the LED and increasing the lifespan of the LED.

In addition, the display device and control method thereof can prevent a line defect from occurring due to steady stress on the LED.

Embodiments have been described above. In the embodiments, some components may be implemented as a "module". Here, the term 'module' indicates, but is not limited to, a software and/or hardware component, such as a Field Programmable Gate Array (FPGA) or Application Specific Integrated Circuit (ASIC), which performs certain tasks. A module may be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

Additionally, embodiments can also be implemented through computer readable code or instructions that are stored in or on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While embodiments have been shown and described above, it will be apparent to those skilled in the art that many variations and modifications may be made to the embodiments without departing from the principles of the present disclose as defined by the attached claims.

What is claimed is:

1. A display device comprising:

a light emitting diode (LED) module including a plurality of LEDs;

a plurality of driving integrated chips (ICs), each of the plurality of driving ICs being configured to apply voltages to a corresponding group of the plurality of LEDs; and a controller configured to identify a first voltage corresponding to a first LED from among the plurality of LEDs based on image data, identify a first LED driving voltage as the first voltage or a second voltage based on the first voltage and a reference value, and control a first driving IC, from among the plurality of driving ICs, that corresponds to the first LED based on the first LED driving voltage, wherein the controller is further configured to:

identify the first voltage as the first LED driving voltage based on the first voltage being greater than the reference value, and identify the second voltage as the first LED driving voltage based on the first voltage being equal to or less than the reference value, and wherein the second voltage is a preset voltage not changed depending on the image data and forward bias of the first LED.

2. The display device of claim 1, wherein the controller is further configured to identify, based on the image data, a second LED, from among the plurality of LEDs, to be driven at the second voltage.

3. The display device of claim 1, wherein each of the plurality of driving ICs is further configured to control a cathode voltage of the corresponding group of the plurality of LEDs, and wherein the controller is further configured to control an anode voltage of the plurality of LEDs and control the plurality of driving ICs.

4. The display device of claim 3, wherein the controller is further configured to control the anode voltage of the plurality of LEDs based on the second voltage.

5. The display device of claim 3, wherein the controller is further configured to identify a driving IC to control the cathode voltage of the first LED, from among the plurality of driving ICs, based on the image data, and cease control of the anode voltage of the first LED while controlling the cathode voltage of the first LED using the driving IC.

6. The display device of claim 1, wherein the controller is further configured to identify the first LED driving voltage as the second voltage based on a screen off signal.

7. The display device of claim 1, wherein the LED module is one from among a plurality of LED modules provided in an LED module array, and wherein the controller is further configured to identify a black LED module, from among the plurality of LED modules, based on the image data indicating driving voltages of each LED of the black LED module as being below the reference value, and apply the second voltage to LEDs of the black LED module.

8. A method of driving a display device including light emitting diodes (LEDs) and a driving integrated circuit (IC) configured to apply a voltage to a group of the LEDs, the method comprising:

receiving image data;

identifying a first voltage corresponding to a first LED from among the LEDs based on the image data;

identifying a first LED driving voltage to be applied to the first LED as the first voltage or a second voltage based on analysis of the first voltage with respect to a reference value; and controlling the driving IC based on the first LED driving voltage, wherein the identifying of the first LED driving voltage comprises:

identifying the first voltage as the first LED driving voltage based on the first voltage being greater than the reference value; and identifying the second voltage as the first LED driving voltage based on the first voltage being equal to or less than the reference value, and wherein the second voltage is a preset voltage not changed depending on the image data and forward bias of the first LED.

9. The method of claim 8, further comprising identifying, based on the image data, a second LED, from among the LEDs, to be driven at the second voltage.

10. The method of claim 8, wherein the controlling comprises:

controlling an anode voltage of the first LED; and controlling the driving IC to control a cathode voltage of the first LED.

11. The method of claim 10, wherein the controlling of the anode voltage comprises controlling the anode voltage to a reference voltage.

12. The method of claim 10, wherein the controlling comprises:

identifying to control the cathode voltage of the first LED based on the image data; and ceasing control of the anode voltage of the first LED while controlling the driving IC.

13. The method of claim 8, further comprising identifying the second voltage as the first LED driving voltage to be applied to the first LED based on a screen off signal.

14. The method of claim 8, wherein the LEDs are comprised in an LED module that is one from among a plurality of LED modules provided in an LED module array, and wherein the controlling comprises:

identifying a black LED module, from among the plurality of LED modules, based on the image data indicating driving voltages of each LED of the black LED module as being below the reference value; and applying the second voltage to LEDs of the black LED module.

15. A display device comprising:

a plurality of light emitting diodes (LEDs);

a driving integrated circuit; and a timing controller configured to:

identify a first voltage based on image data corresponding to a first LED from among the plurality of LEDs;

compare the first voltage with a reference voltage;

identify the first voltage as a first LED driving voltage based on the first voltage being greater than the reference voltage;

identify a second voltage as the first LED driving voltage based on the first voltage being less than or equal to the reference voltage; and control the first LED and the driving integrated circuit based on the first LED driving voltage, wherein the second voltage is a preset voltage not changed depending on the image data and forward bias of the first LED.

16. A non-transitory computer readable recording medium having embodied thereon a program, which when executed by a processor of a display device, causes the display device to execute the method of claim 8.

* * * * *